United States Patent

[11] 3,609,019

[72] Inventor Richard J. Tuber
Encino, Calif.
[21] Appl. No. 847,813
[22] Filed July 28, 1969
[45] Patented Sept. 28, 1971
[73] Assignee North American Philips Corporation
New York, N.Y.
Continuation of application Ser. No.
550,294, May 16, 1966.

[54] FILM PRESENTATION SYSTEM
8 Claims, 6 Drawing Figs.

[52] U.S. Cl. ................................................... 352/17,
352/137, 352/169
[51] Int. Cl. ............................................... G03b 31/00
[50] Field of Search ........................................ 352/15, 16,
17, 20, 92, 169, 137

[56] References Cited
UNITED STATES PATENTS
1,259,066 3/1918 Armat ............................ 352/40
1,944,024 1/1934 Foster ............................ 352/92
2,503,083 4/1950 Waller ............................ 352/17
2,575,203 11/1951 Wolfner ......................... 352/17
2,606,476 8/1952 Waller ........................... 352/17
3,181,421 5/1965 Nimke ........................... 352/17 X Primary Examiner—Samuel S. Matthews
Assistant Examiner—Monroe H. Hayes
Attorney—Frank R. Trifari ABSTRACT: The invention is a system for making combined sound and visual presentations, the entire presentation being a composite of component parts combining sound and visual displays wherein the visual displays may be fixed pictorial presentations or animated pictorial presentations projected at different rates. The system has the purpose of greatly minimizing the amount of film required for the desired presentations. Preferably there is a separate sound tape which generates signals controlling a film projector to operate it at different rates which may include the normal rate for moving pictures; rates which are fractions of this rate for purposes of animation; and for completely stopping the projection at an individual frame for stills. Preferably the stopping of the projector at individual frames is achieved by way of a signal generated from the film strip itself and in the preferred form of the invention this is an optical signal controlling a photocell.

INVENTOR.
RICHARD J. TUBER
BY
Herzig, Walsh & Blackham
ATTORNEYS.

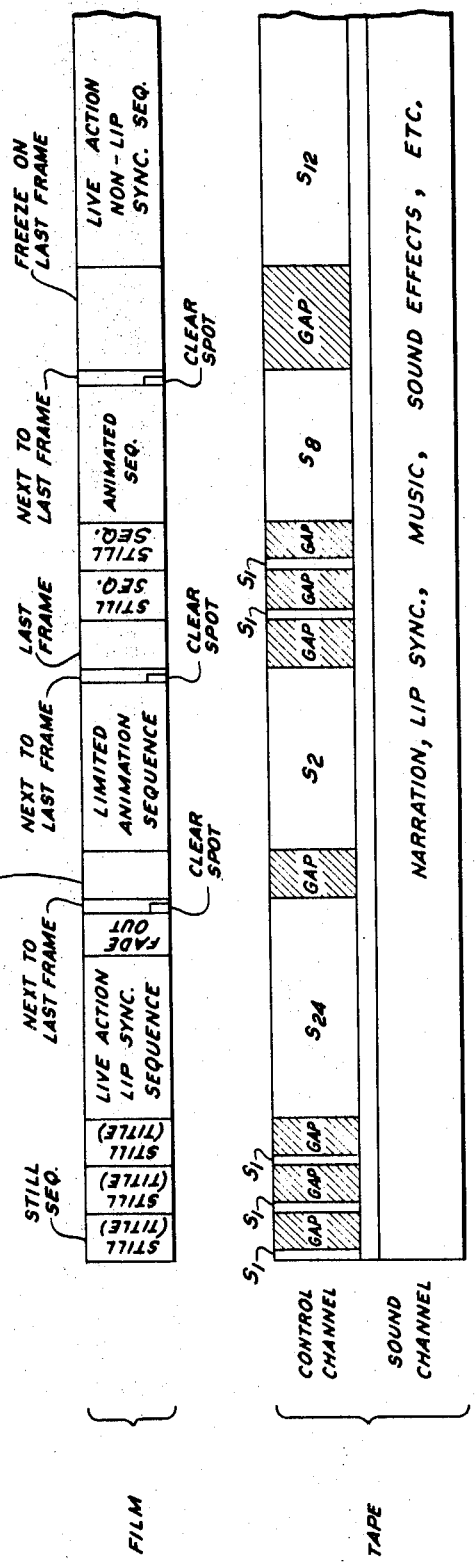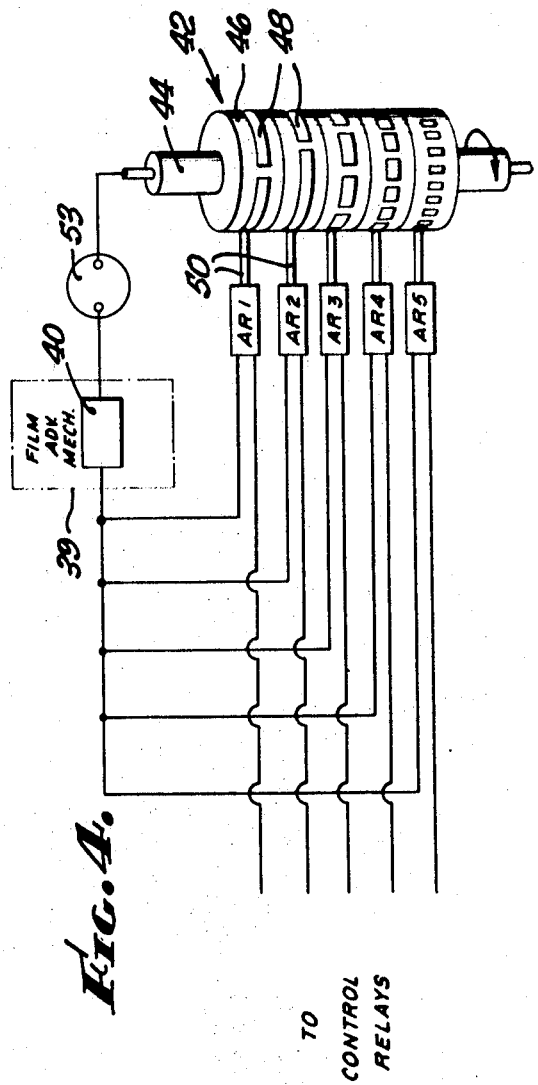

FILM PRESENTATION SYSTEM

This is a continuation of application Ser. No. 550,294, filed May 16, 1966.

The present invention relates generally to a film presentation system, and more particularly to a system for presenting still and/or motion pictures from a filmstrip. The invention also relates to a method for presenting such pictures.

There have heretofore been a great variety of systems and methods for providing visual presentations from a filmstrip in coordination with accompanying sound. In some such systems, the sound-producing means also provides signals to control the visual presentation to achieve the desired coordination. The prior systems appear to be limited, however, to either frame-by-frame advance of a series of slides or pictures, movement of a filmstrip at the standard motion or action picture rate of 24 frames per second, or a combination of the frame-by-frame advance with the standard frame movement. Such prior systems have serious limitations. While the single frame showing saves a substantial amount of film, the use of 24 frames per second for all animation and live action involves the use of a substantial amount of film. In dealing with animation, this also requires the preparation of a very large number of individual frames or pictures involving considerable labor costs.

Applicant has found that animation and live action may be effectively achieved by moving the film at speeds substantially slower than the standard 24 frames per second. Effective results have been achieved at speeds ranging from approximately two frames per second to approximately 12 frames per second. For a great many presentations, large savings in the cost of film and other expenses may be realized by combining the film movement at various different substandard speeds with the holding of the film stationary.

Accordingly, it is a principal object of the present invention to provide a novel and improved film presentation system and method.

It is a further object of the present invention to effect animated and live action motion pictures by moving the film at a rate substantially slower than the heretofore standard rate of 24 frames per second.

Still another object of the present invention is to provide such a system and method for combining a number of different film speeds to economize the cost and provide an effective visual presentation.

Still another object of the present invention is to provide such a system which comprises a quick-stop arrangement, including indicia means on the film itself, to stop the moving film on a single predetermined frame to show a still or title or to facilitate the transition to another speed.

Other objects and advantages of the present invention will become more apparent from the following description and the associated drawings.

In general, a film presentation system in accordance with the present invention comprises a projector means for projecting a visual image from a strip of film and control means to operate the projector means in various modes, including a stop mode where the film is advanced one frame and held stationary with the image from a single frame being projected to provide a still sequence. The modes also include at least one motion mode where the film is moved at a speed substantially slower than the standard cinema rate of 24 frames per second to provide a motion sequence. Preferably, at least two different motion modes are provided. In the operation of the system the mode of operation of the projector means is sequentially changed so as to provide a continuous integrated visual presentation comprised of the various sequences.

In the drawings:

FIG. 4 is a diagrammatic representation of a portion of the system of FIG. 1, illustrating specifically the speed control for the projector;

FIG. 6 is a diagram illustrating the relationship between tape information and film information for a representative portion of a presentation for the system.

Figure 2:
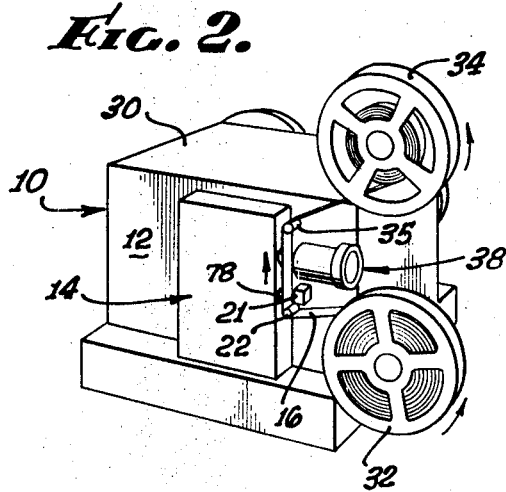
FIG. 2 is a perspective view of one preferred form of apparatus in accordance with the system of FIG. 1.
Figure 3:
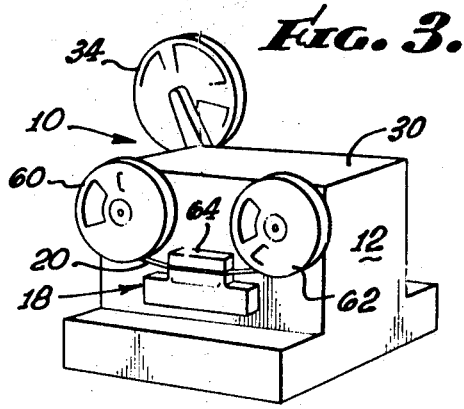
FIG. 3 is a perspective view from the opposite side of the apparatus shown in FIG. 2.

Briefly, the illustrated system 10, which, as noted above, is a presently preferred embodiment of the invention, comprises a portable unit 12 (FIGS. 2 and 3). The unit 12 has a projector means or section 14 for supporting a strip 16 of picture film, and for projecting an image from the information appearing on the film. The unit 12 also includes an audio and control means or section 18 for operating the projector means in various modes to hold the film stationary or to move it at various speeds. More particularly, the control section 18 supports and plays a magnetic tape 20 to provide cuing or control signals which control the modes of operation of the projector section so as to produce a continuous integrated visual presentation comprised of still and motion sequences. The tape 20 also provides sound accompaniment, e.g., narration, music, sound effects, or the like that is coordinated with the visual presentation.

Figure 5:
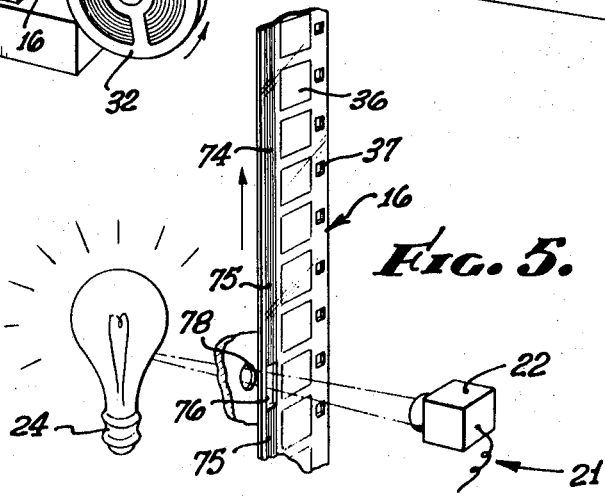
FIG. 5 is an enlarged schematic representation of a portion of the illustrated apparatus, showing particularly a length of a filmstrip and a part of the quick-stop arrangement for stopping the filmstrip at a predetermined single frame.

While the signals on the tape are generally satisfactory to change the operation of the projector section from any one mode of film handling to another, they cannot be depended upon to accurately and consistently stop the moving film precisely on a single predetermined frame at the end of a motion sequence, either to show a still or title sequence or to facilitate the transition to another motion sequence in synchronization with the sound accompaniment. For this purpose, the illustrated unit 12 includes a quick-stop arrangement or means 21 which, as shown best in FIG. 5, includes a photodiode 22 and a light source 24. The quick-stop arrangement operates to override the control signals of the tape to accurately stop the moving filmstrip at a single predetermined frame.

More specifically, the unit 12, as shown in FIGS. 2 and 3, includes a frame or housing 30 that comprises a generally rectangular box structure having a carrying handle for transporting the unit from place to place. A suitable electrical cord plug (not shown) is provided for connecting the unit to a standard electrical outlet.

The unit 12 includes the projector section 14 which is operable at five speeds: one, two, eight, 12 and 24 frames per second. The projector section is operated by the control section or means 18 in accordance with five modes of operation. The modes of operation include four movement modes of operation where the filmstrip is moved at four different speeds of two, eight, 12 or 24 frames per second in different motion sequences. There is also a "stop" or still mode of operation where the filmstrip is advanced one frame and held stationary so that an image from a single frame is projected as a still or title sequence. The unit may be designed for additional modes of operation or for different speeds. It has been found, however, that very effective results, i.e., quality motion and animated pictures, have been achieved with very substantial savings in the cost of film and labor and other expenses through the utilization of two, eight, and 12 frame per second modes of operation.

Figure 1:
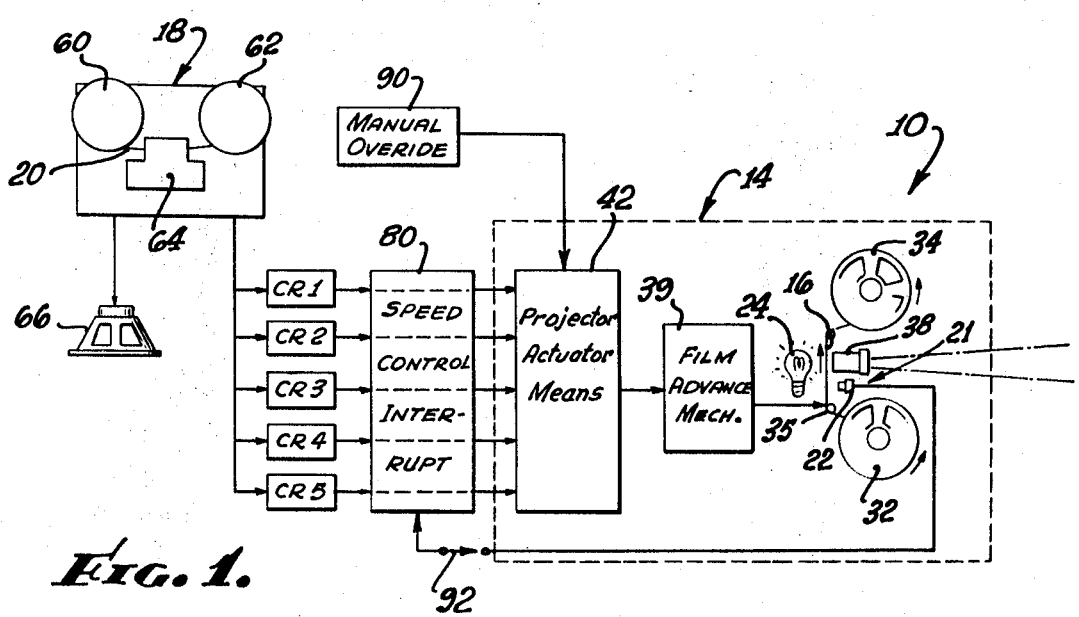
FIG. 1 is a diagrammatic representation of a preferred form of visual and auditory film presentation system that embodies various features of the present invention.

The projector section 14 includes a supply reel 32, a takeup reel 34, and a guide arrangement 35 which supports and guides the filmstrip 16 along a predetermined path, as shown generally in FIGS. 1 and 2, from the supply reel to the takeup reel. The illustrated filmstrip 16 is 16 mm., but it may be of any other desired size, such as 8 or 35 mm., with appropriate modification of the projector section. As shown best in FIG. 5, the film 16 includes a series of individual frames or pictures 36 and a conventional series of sprocket holes 37 above one edge to engage the guide arrangement 35. The path of the film extends through a lens and shutter arrangement 38 which serves to project an image of the information appearing on the film. The lens and shutter arrangement will project an image from a single stationary frame of the film and will also project images from a series of frames moved past it. The film may be moved at various speeds, such as from two frames per second up to the standard 24 frames per second without any substantial flicker of the projected image. Lens and shutter arrangements such as this, which includes direct film cooling, are known in the art and are commercially available.

As illustrated diagrammatically in FIG. 1, the projector section 14 further includes a conventional intermittent film advance mechanism or means 39 that engages the sprocket holes 37 of the film and operates to intermittently move or advance the film. The projector section 14 also includes an actuator means or arrangement 42 for operating the film advance mechanism 39 to move the film at one of the five film speeds of one, two, eight, 12 or 24 frames per second.

As illustrated diagrammatically in FIG. 4, the advance mechanism 39 includes a solenoid 40 which, when energized by the actuator arrangement 42, causes movement of the filmstrip by the advance mechanism. Thus, the solenoid 40 is energized twice a second to move the film two frames per second, 12 times a second to move the film 12 frames per second, and so forth. The actuator arrangement 42 includes a continuously rotating shaft 44 on which are secured a five collars 46 each having differently arranged notches 48. The collars 46 are each positioned to continuously engage an electrical contact or brush 50 except where the collar is notched. Each contact 50 is connected through a normally open electrically operated actuator relay AR1 through AR5 to the solenoid 40 of the film advance mechanism 39. The solenoid is connected to a power source 53 which is connected to the shaft 44. Thus, an actuator circuit is provided from the power source 53, through the solenoid 40, through any closed actuator relay AR and the contact 50 and collar 46 associated with that closed relay, and through the shaft 44, back to the power source 53. When all of the actuator relays are open, the actuator circuits are open so that the solenoid 40 receives no power and does not operate the film advance mechanism. When one actuator relay is closed (the other relays being open), the solenoid 40 is connected to the power source through that relay, and through the contact and notched collar associated with that relay. The notches on that collar cause the solenoid 40 to be energized the appropriate number of times per second for the desired film advance As will be explained more fully below, for the motion modes, the appropriate actuator relay is kept closed for as long as the particular motion mode is desired; for the stop or still mode, the appropriate relay is only closed for a short time (less than 1 second) to permit a one-frame advance followed by no further advance until the next sequence.

To change film speed, one actuator relay is opened while a second actuator relay is closed. The solenoid is thus energized and the film advanced as dictated by the notched collar associated with that second relay, and so on.

The actuator relays are selectively and sequentially controlled, i.e., opened and closed, by the control section or means 18 of the apparatus.

The audio and control section 18 is also mounted on the frame 30 and includes a generally conventional tape deck which, as shown best in FIG. 3, has a supply reel 60, a takeup reel 62, and playing means 64 that includes reproducing heads (not shown). The section 18 also includes a speaker 66 (FIG. 1).

The magnetic tape 20 has a control track or channel which provides the various control and cuing signals or information, and a sound information track or channel which provides narration, music, sound effects, etc. The information from the sound channel is played through the speaker 66. The signals from the control channel are used to control the operation of the projector section. A control or cuing signal of a different frequency is provided for operating the projector section in each of its five different modes to either advance the filmstrip at one of the four different motion speeds or to cause the filmstrip to advance one frame and stop.

More particularly, five normally open tone-sensitive control relays CR1, CR2, CR3, CR4 and CR5 are connected to the output of the playing means 64 to receive the control signals from the control channel of the tape 20. Each of the control relays CR1 through CR5 is connected to one of the actuator relays AR1 through AR5 so that an actuator relay is closed when associated control relay is closed. As described above, the speed of film handling is controlled by the operation of the actuator relays.

Each control relay CR1 through CR5 is closed by a signal of a specific frequency. When the signal ceases, the control relay again opens. Further, should the transmission of the control relay be interrupted even for a fraction of a second while the signal continues, the control relay will open and will not again close until it is reset as by an interruption in the signal.

A fraction of a second interrupt or gap in the signal is sufficient to reset the control relay, with this time varying somewhat with the specific relay used. The signals on the control channel are arranged to produce the desired sequential operation of the projection section and to coordinate or synchronize the visual and audio presentations. The control relays CR2 through CR5 control the motion modes of operation; they are provided with sustained or continuing signals from the tape to keep the respective actuator relays AR2 through AR5 closed for the time for which the projector is to operate at the selected mode. The control relay CR1 controls the still or stop mode of operation; it is provided with a short or momentary signal from the tape to close the actuator relay AR1 for only long enough to advance the film one frame; then the actuator relay AR1 is allowed to open so that there is no film movement for the remainder of the sequence.

As an alternative, the control relay CR1 could be connected by suitable circuitry to the solenoid 40 of the film advance mechanism 39 so that a momentary closing of the relay CR1 would energize the solenoid to advance the film one frame.

As noted above, to ensure a quick, positive stop of the filmstrip at a specific single predetermined frame, the quick-stop arrangement 21 is provided. As shown best in FIG. 5, the filmstrip 16 is itself provided with control or cuing means that comprise a part of the quick-stop arrangement. In this connection, the illustrated filmstrip 16 has a track or band 74 having opaque lengths or portions 75 interrupted by relatively clear or transparent stop or cuing areas, portions or indicia 76 spaced at predetermined locations along the band. The band 74 is positioned along the edge of the filmstrip opposite the sprocket holes 37. The illustrated light source 24 is an electric bulb within the housing 30 and positioned to shine through an aperture 78 in the wall of the housing adjacent the path of the filmstrip The path of the filmstrip causes the band 74 to pass between the photodiode 22 and the aperture 78. So long as an opaque portion 75 is between the photodiode and the aperture 78, the photodiode is not operated. However, when a transparent stop portion 76 reaches a position between the photodiode and the aperture, the photodiode is permitted to view the light and is thereby actuated. The photodiode is connected through suitable circuitry to a normally closed interrupt means 80 which opens to interrupt any connection between the control relays CR1 through CR5 and the actuator relays AR1 through AR5 of the actuator arrangement 42. This results in the actuator relays all being opened and the solenoid not being energized, so that there is no movement of the filmstrip 16. The reaction time of the illustrated apparatus is such that the filmstrip will advance one frame from the position with the stop portion 76 adjacent the photodiode and will stop. The one-frame advance again places an opaque portion 75 of the band adjacent the photodiode and permits the interrupt means 80 to again close. Since, as noted above, once a control relay CR is caused to open (in this case by the interrupt means 80) it requires an interrupt in the signal to it from the tape to reset before it will again close, any continuing control signal from the tape will not affect, i.e., close, the control relay. Therefore, the film will remain in a stationary position even though the interrupt means 80 is closed and there is a continuing signal from the tape. An interrupt in the control signal from the tape will reset the control relay CR so that a control signal from the tape after the interrupt will actuate the appropriate control relay and cause the projector section to be operated in the desired mode. Thus, a single frame of the filmstrip may be precisely and positively positioned so as to be projected by the lens and shutter arrangement 38 even when the projector must make a transition from a rapid speed, such as 24 frames per second, to a stop at a particular single frame.

An overriding manual control 90 is provided for the projector actuator arrangement to permit the operator to change the mode of operation of the projector means regardless of the control signal being provided by the tape. The photodiode circuit may be bypassed by opening a switch 92 as when the apparatus is to be used for showing conventional sound film.

The control or cuing signals may be put on the control channel of the tape by a standard signal generator. Effective results have been achieved with the following frequency values, although it will be appreciated that other values may be used.

S1 (single frame advance and stop) — frequency of 27.0 sine wave (controls relay CR1)

S2 (2 frames per second) — frequency of 31.8 sine wave (controls relay CR2)

S8 (8 frames per second — frequency of 35.6 sine wave (controls relay CR3)

S12 (12 frames per second) — frequency of 39.6 sine wave (controls relay CR4)

S24 (24 frames per second) — frequency of 43.3 sine wave (controls relay CR5)

OPERATION

The operation of the illustrated system will now be more readily understood. As the magnetic tape 20 is played, sound is provided through the speaker means 66 and the control signals on the tape selectively and sequentially operate the control relays CR1 through CR5 to selectively and sequentially change the mode of operation of the projector means to correlate the picture image being projected and the sound being produced. Any sequence of modes may be used and the time duration for any of the modes may be selected as desired. The projector means remains on a particular mode of operation until a new signal is presented by the tape to change the mode or until a clear area 76 on the film causes the film to be stopped at a predetermined single frame.

FIG. 6 diagrammatically illustrates a sample portion of a presentation, with the information presented on the filmstrip correlated generally in time with the information presented on the channels of the magnetic tape. While the indications of the film and tape information are collated with one another, they are not on a true time scale but are distorted (lengthened or shortened) to permit legible illustration of various aspects of the presentation.

As noted above, the designations S2, S8, S12 and S24 represent the signals for producing projector speeds of two, eight, 12 and 24 frames per second and the designation S1 represents the signal for causing the film strip to be advanced a single frame and then held stationary.

As illustrated in FIG. 6, first a momentary S1 signal is given, closing control relay CR1 which causes the filmstrip to be advanced one frame to a title or still frame and then held stationary for a still sequence. More particularly, the actuator relay AR1 is momentarily closed to start to energize the solenoid 40 at one frame per second through the associated collar 46. The solenoid starts to operate the film advance mechanism 39 at one frame per second. The control relays tend to reopen as soon as the control signal is stopped so that control relay CR1 is only momentarily closed. The S1 signal lasts for a convenient interval of less than 1 second. When the control relay CR1 opens again, the actuator relay AR1 also opens so that there is no longer an actuating circuit between the power source 53 and the solenoid 40. The solenoid and film advance mechanism are inactive until there is another signal from the tape. Thus, after the one-frame advance, the filmstrip will remain at that position for as long as desired until there is another signal. While the filmstrip remains on this first title, the sound track or channel of the tape provides sound associated with that title. After the momentary S1 signal there is no signal on the control channel of the tape for the duration of the appearance of the first title.

After the first title has appeared for appropriate time, another momentary S1 signal is given by the tape control channel and the film is again advanced one frame and held stationary for another still sequence. Again the associated sound is provided. This is repeated for the third title by another momentary S1 signal.

Then a continuing S24 signal is provided by the control channel to move the film at 24 frames per second for a live-action lip-synchronization sequence. More specifically, the actuator relay AR5 is closed and kept closed to energize the solenoid 40 at 24 frames per second through the associated collar. The film advance mechanism 39 is thereby operated at 24 frames per second by the solenoid. The S24 signal is continued for the length of time for which it is desired to move the filmstrip at 24 frames per second. The film may include a fadeout or dissolve portion at the end of the sequence.

The quick-stop means 21 is actuated by a clear or stop area 76 on the filmstrip to stop the strip on the last frame of this 24 frames per second sequence. More specifically, the clear are 76 is adjacent the aperture 78 when the filmstrip is positioned with the next to the last frame of this 24 frames per second sequence being projected by the lens and shutter arrangement 38. This causes the photodiode 22 to open the interrupt means 80 to interrupt any signal from the control relay CR5 to the actuator relay AR5 and to thereby stop the film. As noted above, the filmstrip is stopped one frame beyond its position with the clear area 76 adjacent the aperture 78 and the photodiode 22. This one-frame override again blocks the light to the photodiode, which permits the interrupt means 80 to close after a momentary interrupt of a fraction of a second. The filmstrip is thus stopped with the last frame of the 24 frames per second sequence being projected by the projector means. This last frame may be a black frame, i.e., the last frame of a fadeout or dissolve, rather than a picture frame. The film may be stopped at the last frame of a sequence for any convenient length of time.

The signal S24 from the tape is also stopped at about the end of the 24 frames per second sequence, and no signal provided by the tape until it is desired to start the next sequence.

The construction of the apparatus permits the signal S24 from the tape to extend or continue beyond the momentary opening of the interrupt means 80. As noted above, momentary interrupting the transmission from a control relay CR causes that control relay to open and stay open, while momentarily interrupting the signal from the tape to the control relay CR causes that control relay to open only during the interrupt. Thus, once the control relay CR5 has its transmission interrupted by the interrupt means 80, it remains open until it is reset by an interrupt in the control signal to it from the tape. This prevents undesired movement of the film caused by the signal S24 continuing beyond the momentary interrupt by the quick-stop means. While the control signal S24 can thus continue after the film has reached the predetermined frame where it is stopped by the quick-stop means, the control signal should not stop before the predetermined frame is reached, since the film will be out of synchronization, i.e., the next signal intended to start the next sequence will start the tape from where the foreshortened S24 signal permitted it to stop. Therefore, in producing the signals on the control channel, the signal S24 can be made to overlap the end of the 24 frames per second sequence, so long as it does not fall short of the end of that sequence. The filmstrip is thus stopped to ensure synchronization at the start of the next sequence, i.e., the film will be projecting the last frame of the immediately preceding sequence so that, when there is another control signal from the tape to begin the next sequence, the film starts from the beginning of that next sequence.

Then a continuing S2 signal is provided by the tape control channel to close the control relay CR2 and thereby move the film two frames per second for a limited animation sequence. A clear area 76 is provided on the filmstrip to stop the strip with the last frame of the limited animation sequence positioned to be projected by the lens and shutter arrangement. The signal S2 is also stopped at the end of the sequence and a gap is provided before the signal starting the next sequence.

Then, a momentary S1 signal is provided to advance the film one frame and hold it stationary on that frame to show a still until there is another signal. Then, after another momentary S1 signal and the showing of another still, a continuing S8 signal is provided by the tape control channel to cause the filmstrip to be moved at eight frames per second for an animated sequence. Just before the S8 signal is terminated, a clear area 76 on the film actuates the quick-stop means to freeze or hold the filmstrip stationary to project the last frame of the sequence. Next a continuing S12 signal is provided to cause the filmstrip to be moved at 12 frames per second for a live-action non-lip-synchronization sequence. The presentation continues in this manner with various animated and live action as well as still sequences provided sequentially in a continuous integrated visual presentation. The sound from the sound channel is coordinated with the visual sequences.

Thus, relatively economical, durable and efficient apparatus is provided which shows still sequences and motion and animated sequences at various speeds, some slower than the standard motion picture or cinema rate of 24 frames per second. A positive stop is provided for changing the film from a motion sequence to a showing of a single predetermined frame for a still sequence or to facilitate the transition from the motion sequence to another motion sequence. Further, animation or action is provided with less film and associated cost by the showing of at least portions of the film at less than the standard cinema rate.

Various modifications and changes may be made in the illustrated structure without departing from the spirit and scope of the present invention.

Various features of the present invention are set forth in the following claims.

I claim:

1. An automatic picture film presentation system comprising projector means for supporting and advancing a strip of film and projecting a visual presentation from the information on the film, and control means for providing control signals for regulating the operation of said projector means in at least three different modes of operation to project a visual component-presentation from the film for each mode of its operation, said modes including a first motion mode wherein the film is moved at the standard speed for motion picture projection, at least one other motion mode where the film is moved at a predetermined constant speed substantially slower than the standard speed for motion picture projection, and a third mode wherein the film is stopped at individual frames to display still picture said control means comprising a record carrier having an audio track and a control track containing first, second and third control signals comprising tones of different predetermined frequencies corresponding to said first, second and third operation modes, respectively, a separate tone-sensitive relay for each mode of operation of said projector means with each of said relays being operable by a different one of said frequency tones, said relays being connected in the circuit between said control track and said projector means for selectively passing the respective control signal to said projector means for actuating said projector means to operate in the related mode, and means for continuously moving said record carrier at a constant speed during each of said operating modes and in a manner such that the movement of said record carrier is independent of control by the filmstrip, said control signals being provided in predetermined sequence to automatically and sequentially change the mode of operation of said projection means without manual intervention and at predetermined time intervals so as to project a visual composite-presentation comprised of said component-presentations.

2. An automatic picture film presentation system comprising projector means for supporting and advancing a strip of film and projecting a visual presentation from the information on the film, and control means for providing control signals for regulating the operation of said projector means in at least three different modes of operation to project a visual component-presentation from the film for each mode of its operation, said modes including a first motion mode wherein the film is moved at the standard speed for motion picture projection, at least one other motion mode where the film is moved at a predetermined constant speed substantially slower than the standard speed for motion picture projection, and a third mode wherein the film is stopped at individual frames to display still pictures, said filmstrip, said control signals being provided in predetermined sequence to automatically and sequentially change the mode of operation of said projection means without manual intervention and at predetermined time intervals so as to project a visual composite-presentation comprised of said component-presentations. comprising a record carrier having an audio track and a control track containing first, second and third control signals corresponding to said first, second and third operation modes, respectively, actuator means coupled to said projector means and including means for selectively generating pulse signals at three different rates corresponding to said three operation modes, and switching means selectively interconnecting the record carrier control track with said actuator means as a function of the signal on said control track, said control means controlling said projector means to synchronize the visual presentation with said audio track, and means for continuously moving said record carrier at a constant speed during each of said operating modes and in a manner such that the movement of said record carrier is independent of control by the film strip, said control signals being provided in predetermined sequence to automatically and sequentially change the mode of operation of said projection means without manual intervention and at predetermined time intervals so as to project a visual composite-presentation comprised of all component-presentations.

3. A system as called for in claim 2, comprising stop means that include cuing means on the filmstrip itself, said stop means being operatively associated with said projector means and actuated by said cuing means on the filmstrip to control the movement of the filmstrip from film movement to a stop position of the film at a single predetermined frame.

4. A film presentation system as called for in claim 2, including means for stopping the film at a specific predetermined frame, said stopping means including light sensitive means at one side of the path of the film and a light source at the other side of said path, said stopping means further comprising track means disposed along the filmstrip, said track means including at least one generally opaque portion and at least one relatively light-transmitting portion aligned along said track means, said track means being disposed intermediate said light source and said light sensitive means, said light sensitive means being operatively associated with said projector means to change the operation of said projector means between operation modes when said light sensitive means is actuated by said light source, said portions being positioned along said track so as to accurately stop the moving film at a predetermined single frame in which said opaque portion is aligned with said light sensitive means and said light source.

5. A film presentation system as called for in claim 2 wherein said switching means includes a separate tone-sensitive relay for each mode of operation of said projector means for actuating said projector means to operate in the related mode, each of said relays being operable by a tone having a different predetermined frequency, said control signal comprising tones of said different frequencies.

6. A system as described in claim 2 including means for generating stop signals by said film for controlling the stopping of the film at individual frames, said system further comprising signal interrupt means connected between said switching means and said actuator means and responsive to said stop signals to block the transmission path therebetween upon receipt of a stop signal from said film.

7. A system as described in claim 6 wherein said switching means includes a frequency sensitive relay associated with each of said control track signals for actuating said projector means to operate in the related mode, said first, second and third control signals being of different frequencies, and said actuator means comprises a rotating drum having a notched channel corresponding to each of said relays for generating signal pulses at different repetition rates related to the corresponding operation mode of the projector.

8. An automatic picture film presentation system comprising projector means for supporting and advancing a strip of film and projecting a visual presentation from the information on the film, and control means for providing control signals for regulating the operation of said projector means in at least three different modes of operation to project a visual component-presentation from the film for each mode of its operation, said modes including a first motion modes wherein the mode is moved at the standard speed for motion picture projection, at least one other motion mode where the film is moved at a predetermined constant speed substantially slower than the standard speed for motion picture projection, and a third mode wherein the film is stopped at individual frames to display still pictures, said control means comprising a record carrier having an audio track and a control track containing first, second and third control signals corresponding to said first, second and third operation modes, respectively, said record carrier comprising a continuously running tape having a sound recording thereon and means whereby said tape generates the control signals to coordinate the sound and visual presentation, and said control means further includes means responsive to an electrical characteristic of the tape control signals which is independent of the spacing of said signals on the tape for stepping said film advancing means at a different rate for each tape control signal in a manner such that the stepping rate is independent of the signal spacing on the tape, and means for continuously moving said record carrier at a constant speed during each of said operating modes and in a manner such that the movement of said record carrier is independent of control by the filmstrip, said control signals being provided in predetermined sequence to automatically and sequentially change the mode of operation of said projection means without manual intervention and at predetermined time intervals so as to project a visual composite-presentation comprised of said component-presentations.